Aug. 31, 1948.  H. S. MILLER  2,448,110
METHOD OF PREPARING VINYL CHLORIDE
AND CATALYST THEREFOR
Filed March 16, 1946
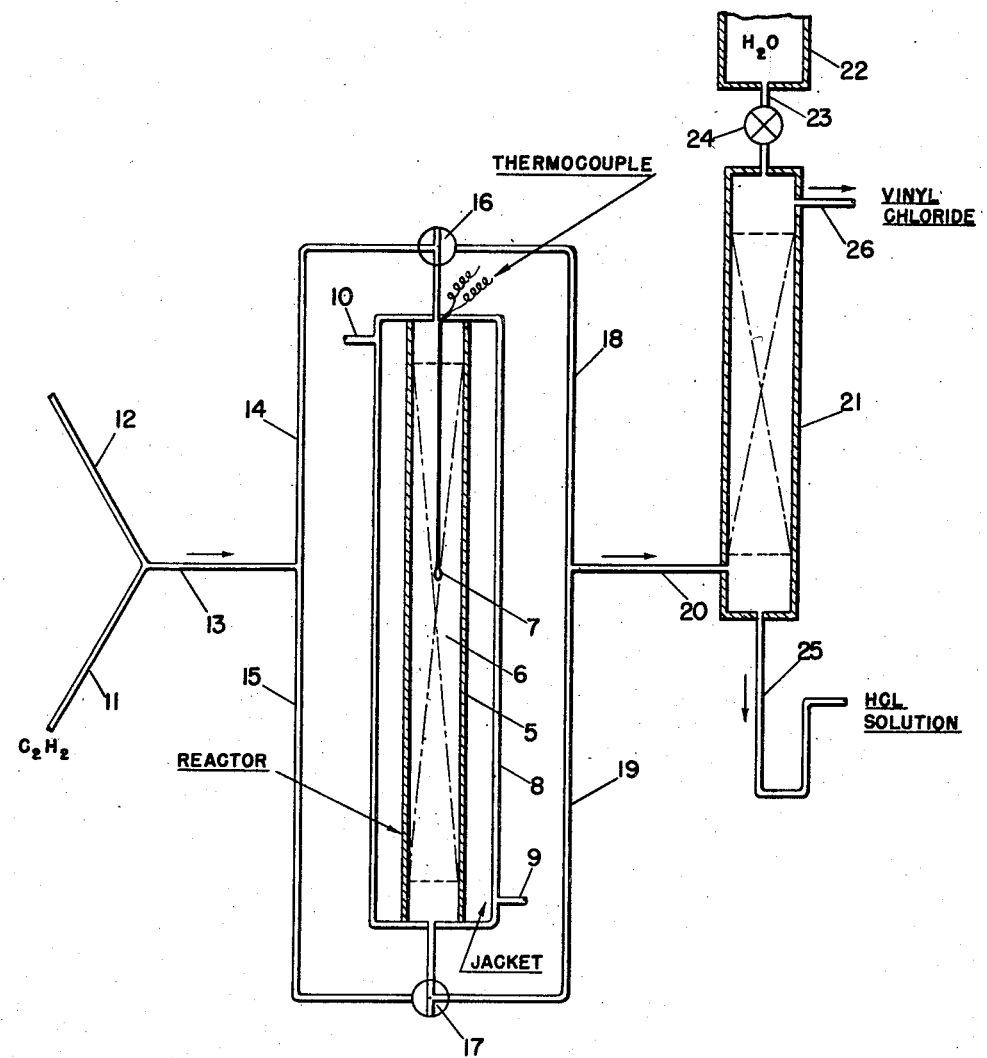
INVENTOR
*Hoke S. Miller*
BY
*Pennie Edmonds Morton & Barrows*
ATTORNEYS Patented Aug. 31, 1948

2,448,110

UNITED STATES PATENT OFFICE 2,448,110

METHOD OF PREPARING VINYL CHLORIDE AND CATALYST THEREFOR

Hoke S. Miller, Stamford, Conn., assignor to Air Reduction Company, Incorporated, New York, N. Y., a corporation of New York Application March 16, 1946, Serial No. 654,849

7 Claims. (Cl. 260—652)

This invention relates to a method of preparing vinyl chloride and to an improved catalyst adapted to facilitate and to prolong the effective working period of operation.

The addition reaction of acetylene and hydrogen chloride to produce vinyl chloride is well known. It may be conducted in the presence of mercuric chloride as a catalyst. The mercuric chloride is usually supported on a porous carrier such as activated carbon. The life of such a catalyst is very short, and hence the procedure is not well adapted for commercial production of the desired product. Various attempts to avoid rapid deterioration of the catalyst have failed to effect any substantial improvement.

It is the object of the present invention to provide a method of preparing vinyl chloride which can be operated effectively over relatively long periods, and a catalyst for the reaction which is both effective and rugged.

Other objects and advantages of the invention will be apparent as it is better understood by reference to the following specification and the accompanying drawing, which illustrates diagrammatically an apparatus suitable for the practice of the method.

I have discovered that a catalyst comprising mercuric chloride and thorium chloride is particularly effective in the production of vinyl chloride and that the life of the catalyst may be prolonged materially by inclusion of a relatively small proportion of thorium chloride. The exact amount of thorium chloride is not critical. Concentrations of from 0.1% to 8.0% of thorium chloride in the catalyst have been found to be satisfactory, and larger amounts may undoubtedly be used. The proportions of mercuric chloride may vary over a wide range, that is, from 4.0% to 32.0% of the total catalyst weight including the activated carbon or other porous material employed as a support. Even greater amounts of mercuric chloride may be employed.

The catalyst can be prepared by dissolving suitable proportions of mercuric chloride and thorium chloride in water and pouring the resulting solutions over an activated carbon or other suitable porous support. The latter is then dried over a steam bath and finally in an oven at 110° C., after which it may be stored for future use. If very high concentrations of mercuric chloride are desired in the catalyst, solvents other than water may be used.

The following compositions prepared in the manner described have been found satisfactory. They are, however, merely illustrative of possible combinations in which thorium chloride can be combined with mercuric chloride for the purpose of the invention.

| Percent $ThCl_4$ | Percent $HgCl_2$ |
|---|---|
| 0.2 | 8 |
| 0.3 | 8 |
| 8 | 8 |
| 0.2 | 4 |
| 0.2 | 16 |
| 0.2 | 32 |
| 0.5 | 8 |
| 0.1 | 8 |

In the practice of the invention, a suitable reactor is employed which may be filled with a catalyst as described. Acetylene and hydrogen chloride are introduced in suitable proportions to the catalyst. Stoichiometric proportions are suitable, that is to say, equal volumes of the two gases. The mixture of gases is passed through the catalyst, which is maintained at a suitable temperature, preferably by the use of a jacket surrounding the reaction chamber and including a liquid such as "Dowtherm," a mixture of diphenyl and diphenyl oxide, which may be employed to increase or decrease the temperature of the reaction. The temperature, which at the commencement of the reaction should be at least 100° C., may be increased during the continuation of the reaction to approximately 250° C. or higher. The reaction is exothermic and after it has been initiated it may be necessary to remove some of the heat developed in order to prevent excessive temperatures in the catalyst bed.

The product of the reaction is withdrawn and washed with water to remove any hydrogen chloride. The vinyl chloride, which constitutes the major part of the remaining vapor, may be separated and purified in any suitable manner.

Since mercuric chloride has an appreciable vapor pressure at the temperature of operation, it may be desirable to reverse the direction of flow of the gases through the catalyst bed. In this manner, escape of any substantial proportion of the mercuric chloride which may be driven from the point of highest temperature is prevented. However, this precaution is not essential to the practice of the present invention. The inclusion of thorium chloride in the catalyst has been found to materially prolong the effective operation of the procedure so that it is practicable from a commercial standpoint and may be used in the commercial production of vinyl chloride.

Referring to the drawing, 5 indicates a catalyst chamber which may be constructed of any suitable material which is not affected by the materials entering the reaction. It is filled with a catalyst bed 6. A thermocouple 7 is disposed in the catalyst bed in order that the existing temperatures may be observed. A jacket 8 surrounds the catalyst chamber and is provided with an inlet 9 and an outlet 10 permitting circulation of a suitable liquid through the jacket in order to control the temperature of the reaction.

Acetylene is supplied through a pipe 11 and hydrogen chloride is supplied through a pipe 12. The gases mingle in a pipe 13 and are delivered to pipes 14 and 15 which lead to opposite ends of the catalyst chamber. Two-way valves 16 and 17 permit direction of the gas mixture to either end of the catalyst chamber as desired, permitting reversal of flow thereof through the catalyst bed. Outlet pipes 18 and 19 are similarly connected to the two-way valves 16 and 17 to permit withdrawal of the products from either end of the catalyst chamber. It is to be understood that the gaseous mixture entering the top of the catalyst chamber passes therethrough and the end products are withdrawn from the bottom of the catalyst chamber. When the operation is reversed, the gaseous mixture enters the bottom of the catalyst chamber and the end products are withdrawn from the top thereof.

The reaction or end products are delivered by a pipe 20 to a tower 21 which may be filled with any suitable material to increase surface contact of the gas with water which is supplied from a tank 22 to a pipe 23 controlled by a valve 24. The water flowing downwardly through the tower in contact with the gases rising therethrough removes any hydrogen chloride from the gaseous mixture, and the solution escapes through a pipe 25. The remaining gases, principally vinyl chloride, escape through a pipe 26 and may be treated in any suitable manner to secure the desired product.

The following examples will serve to illustrate the practice of the invention:

Example I

A catalyst was prepared by evaporating and drying a mixture of activated carbon pellets and an aqeuous solution containing sufficient mercuric chloride and thorium chloride to produce a final catalyst mass containing about 8% of mercuric chloride and about 0.5% of thorium chloride. 100 cc. of this catalyst was placed in a reaction tube ⅞ inch in diameter by about 2 feet in length, having a thermocouple at the center of the catalyst bed. A mixture of equal parts of acetylene and hydrogen chloride was led into the reaction tube at the rate of 0.52 cubic foot per hour. The temperature at the midpoint of the catalyst bed ranged from 149° to 182° C. After 26 days of operation, the conversion dropped from over 97% to 93.2%. After 31 days, 90.4% of the hydrogen chloride was still being converted to vinyl chloride. On the 41st day, the conversion had dropped to 54%, the temperature at the center of the catalyst then being 218° C.

Example II

Using a mercuric chloride-thorium chloride catalyst and feed rates as described in Example I, a run was made in which the direction of flow of gases through the reaction tube was reversed every 24 hours. During the first 15 days, with a catalyst midpoint temperature ranging from 130° to 151° C., the conversion to vinyl chloride was 99%. On the 28th day, at a temperature of 178° C., the conversion was still 96.8%. On the 38th day of operation, the conversion of hydrochloric acid was 95.6% at a temperature of 189° C. On the 47th day of operation the conversion of hydrochloric acid was 89.4% at a temperature of 170° C.

The results shown in the examples demonstrate the effectiveness of the new catalyst including thorium chloride in the reaction. In a run similar to Example I, in which a catalyst was used including 8% of mercuric chloride without the addition of thorium chloride, the conversion dropped after the 9th day to 15.4% and an increase in the catalyst temperature to 238° C. raised the conversion only to 62.4%. The life of such a catalyst in the procedure is not, therefore, greater than about 10 days, whereas, as shown by the examples, it is possible to maintain high conversion rates with a catalyst including thorium chloride for at least three times that period.

Although I prefer activated carbon as a carrier for the catalyst, other well known porous carriers such as pumice, "Filtrol" and the like may be employed. The invention rests primarily in the addition of thorium chloride to mercuric chloride to afford a catalyst which is both effective and rugged.

Various changes may be made in the composition of the catalyst and in the details of procedure as described without departing from the invention or sacrificing the advantages thereof.

I claim:

1. The method of preparing vinyl chloride which comprises reacting acetylene and hydrogen chloride in the presence of a heated catalyst consisting essentially of mercuric chloride and thorium chloride on a porous carrier.

2. The method of preparing vinyl chloride which comprises reacting acetylene and hydrogen chloride in the presence of a heated catalyst consisting essentially of mercuric chloride and thorium chloride on a porous carrier, and periodically reversing the direction of flow of the acetylene and hydrogen chloride through the catalyst.

3. The method of preparing vinyl chloride which comprises reacting acetylene and hydrogen chloride in the presence of a heated catalyst consisting essentially of mercuric chloride and thorium chloride on a porous carrier at a temperature between 100° and 250° C.

4. The method of preparing vinyl chloride which comprises reacting acetylene and hydrogen chloride in the presence of a heated catalyst consisting essentially of mercuric chloride 4.0 to 32.0%, thorium chloride 0.1 to 8.0% by weight on a porous carrier.

5. The method of preparing vinyl chloride which comprises reacting acetylene and hydrogen chloride in the presence of a heated catalyst consisting essentially of mercuric chloride 4.0 to 32.0%, thorium chloride 0.1 to 8.0% by weight on a porous carrier at a temperature between 100° and 250° C.

6. An improved catalyst for the reaction of acetylene and hydrogen chloride consisting essentially of mercuric chloride and thorium chloride on a porous carrier.

7. An improved catalyst for the reaction of acetylene and hydrogen chloride consisting essentially of mercuric chloride 4.0 to 32.0% and thorium chloride 0.1 to 8.0% by weight on a porous carrier.

HOKE S. MILLER.

REFERENCES CITED

The following references are of record in the file of this patent:

UNITED STATES PATENTS

| Number | Name | Date |
| --- | --- | --- |
| 2,183,240 | Jung | Dec. 12, 1939 |
| 2,225,635 | Japs | Dec. 24, 1940 |
| 2,265,286 | Japs | Dec. 9, 1941 |
| 2,407,701 | Jones et al. | Sept. 17, 1946 |

FOREIGN PATENTS

| Number | Country | Date |
| --- | --- | --- |
| 435,858 | Great Britain | Oct. 1, 1935 |